(12) United States Patent
Yokomizo et al.

(10) Patent No.: US 7,542,968 B2
(45) Date of Patent: Jun. 2, 2009

(54) ATTRIBUTE DATA MANAGEMENT SYSTEM

(75) Inventors: Kazuhiro Yokomizo, Machida (JP); Keiji Satoh, Yamato (JP)

(73) Assignee: International Business Machines Corporation, Armonk, NY (US)

( * ) Notice: Subject to any disclaimer, the term of this patent is extended or adjusted under 35 U.S.C. 154(b) by 270 days.

(21) Appl. No.: 11/400,988

(22) Filed: Apr. 10, 2006

(65) Prior Publication Data
US 2006/0230232 A1 Oct. 12, 2006

(30) Foreign Application Priority Data
Apr. 11, 2005 (JP) ............... 2005-113381

(51) Int. Cl.
*G06F 17/00* (2006.01)
(52) U.S. Cl. ............... 707/3; 711/118; 711/128
(58) Field of Classification Search ............ None
See application file for complete search history.

(56) References Cited

U.S. PATENT DOCUMENTS

| | | | | |
|---|---|---|---|---|
| 4,118,788 A | * | 10/1978 | Roberts | 707/3 |
| 5,504,889 A | * | 4/1996 | Burgess | 707/100 |
| 5,615,362 A | * | 3/1997 | Jensen et al. | 707/103 R |
| 6,675,171 B2 | * | 1/2004 | Tikkanen et al. | 707/101 |
| 2003/0061227 A1 | * | 3/2003 | Baskins et al. | 707/101 |

FOREIGN PATENT DOCUMENTS

| | | |
|---|---|---|
| JP | 06-274401 | 9/1994 |
| JP | 2000-120385 | 1/2000 |

* cited by examiner

*Primary Examiner*—Mohammad Ali
*Assistant Examiner*—Syed H Hasan
(74) *Attorney, Agent, or Firm*—Gerald R. Woods

(57) ABSTRACT

Cache hit ratio is improved in a cache apparatus that reads and caches contents from a large-scale database. The cache apparatus includes a cache section for recording a plurality of sets. Each set includes an attribute ID, an extractor for extracting the attribute ID from an object ID, and attribute data identified by the attribute ID. The cache apparatus receives an object ID and extracts an attribute ID from the object ID using an extractor recorded in the cache section. If the extracted attribute ID coincides with attribute ID cached in association with the extractor, the cache apparatus returns attribute data recorded in association with the extractor. On the other hand, if the extracted attribute ID does not coincide with the attribute ID recorded in association with the extractor, the cache apparatus receives attribute data and an extractor from a DB using the object ID, and caches the read extractor and attribute data in the cache section in association with attribute ID.

10 Claims, 9 Drawing Sheets

FIG. 4

| EXTRACTOR | ATTRIBUTE IDENTIFICATION INFORMATION | ATTRIBUTE DATA |
|---|---|---|
| FFF0000 ··· 0 | 0010000 ··· 0 | COMPANY A |
| FFF0000 ··· 0 | 0020000 ··· 0 | COMPANY B |
| FFF0000 ··· 0 | 0030000 ··· 0 | COMPANY C |
| ⋮ | ⋮ | ⋮ |
| 000FFF0 ··· 0 | 0000010 ··· 0 | COMPUTER A |
| 000FFF0 ··· 0 | 0000020 ··· 0 | PRINTER B |
| 000FFF0 ··· 0 | 0000030 ··· 0 | FACSIMILE C |
| ⋮ | ⋮ | ⋮ |

300

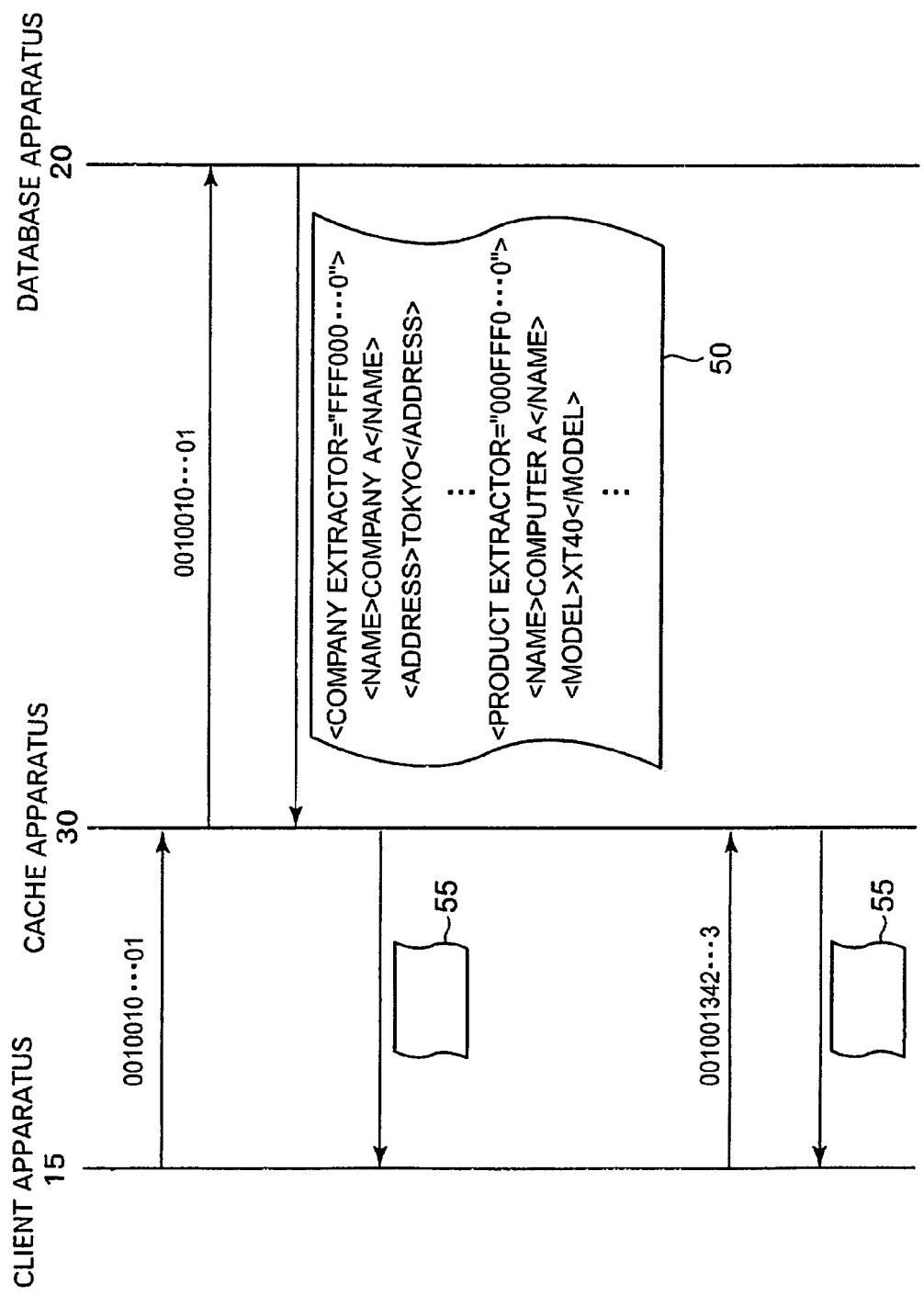

FIG. 6A

| ATTRIBUTE IDENTIFICATION INFORMATION | MANUFACTURER | PRODUCT NAME |
|---|---|---|
| 001****⋯* | ATTRIBUTE DATA OF COMPANY A | |
| ***001⋯* | | ATTRIBUTE DATA OF COMPUTER A |
| 002****⋯* | ATTRIBUTE DATA OF COMPANY B | |
| ***002⋯* | | ATTRIBUTE DATA OF PRINTER B |
| ***003⋯* | | ATTRIBUTE DATA OF FACSIMILE C |
| ***004⋯* | | ATTRIBUTE DATA OF COPYING MACHINE D |
| 003****⋯* | ATTRIBUTE DATA OF COMPANY C | |
| ***005⋯* | | ATTRIBUTE DATA OF DIGITAL CAMERA E |
| ***006⋯* | | ATTRIBUTE DATA OF PRINTER F |

FIG. 6B

| OBJECT IDENTIFICATION INFORMATION | MANUFACTURER | PRODUCT NAME |
|---|---|---|
| 0010010⋯1 | ATTRIBUTE DATA OF COMPANY A | ATTRIBUTE DATA OF COMPUTER A |
| 0010010⋯2 | ATTRIBUTE DATA OF COMPANY A | ATTRIBUTE DATA OF COMPUTER A |
| 0010010⋯3 | ATTRIBUTE DATA OF COMPANY A | ATTRIBUTE DAT OF COMPUTER A |
| 0020020⋯1 | ATTRIBUTE DATA OF COMPANY B | ATTRIBUTE DATA OF PRINTER B |
| 0020030⋯1 | ATTRIBUTE DATA OF COMPANY B | ATTRIBUTE DATA OF PRINTER B |
| 0020030⋯2 | ATTRIBUTE DATA OF COMPANY B | ATTRIBUTE DATA OF PRINTER B |
| 0020040⋯1 | ATTRIBUTE DATA OF COMPANY C | ATTRIBUTE DATA OF COPYING MACHINE D |
| 0030050⋯1 | ATTRIBUTE DATA OF COMPANY C | ATTRIBUTE DATA OF DIGITAL CAMERA E |
| 0030060⋯1 | ATTRIBUTE DATA OF COMPANY C | ATTRIBUTE DATA OF PRINTER F |

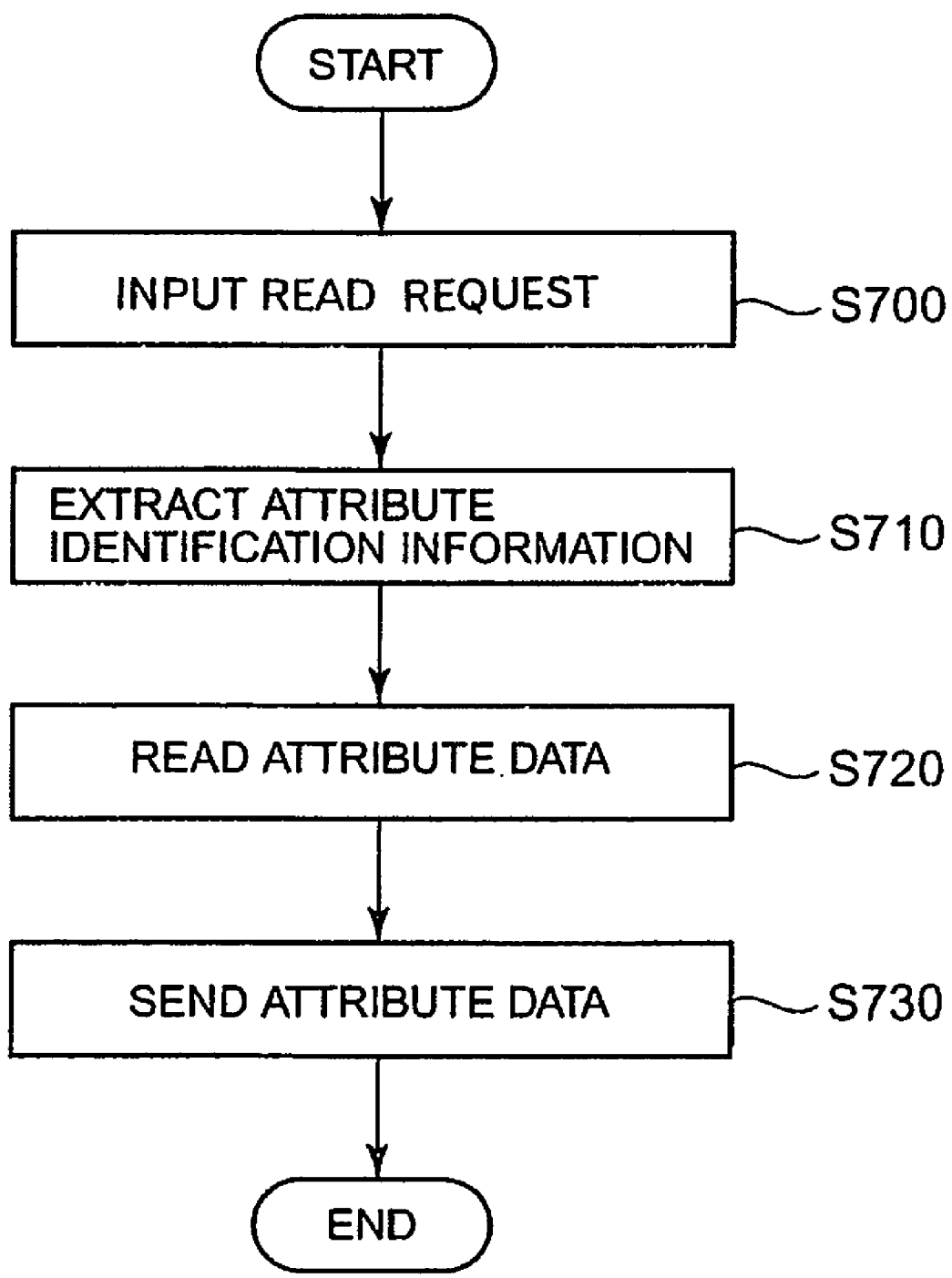

ATTRIBUTE DATA MANAGEMENT SYSTEM

FIELD OF THE INVENTION

The present invention relates to a cache apparatus, an attribute data management system, a database apparatus, a control method, and a program. Particularly, the present invention relates to a cache apparatus, an attribute data management system, a database apparatus, a control method, and a program, which are implemented in relation to an attribute database for recording attribute data in association with identification information.

BACKGROUND ART

Recently, studies have been conducted on merchandise management using the technology of wireless IC tags (also called RFID (Radio Frequency Identification) technology). According to this technology, a plurality of wireless IC tags can be read at the same time, so that some different identifier (a serial number or the like) in each individual product can be managed as an object, rather than assigning an ID to each box containing a plurality of individual products.

Merchandise management with wireless IC tags can manage a huge volume of attribute data and also keep track of different attribute data for different administrators for the same attribute or product. Further, most of the attribute data is publicly viewable. Thus, the attribute data may be distributed and managed on a wide-area network, so that a user can access the attribute data through the network. In order to efficiently access such attribute data on the network, it is important to minimize the amount of access. To this end, it is desirable to save attribute data once it has been accessed for reuse.

A cache system technique has been previously proposed to ensure data consistency in a system in which each of a plurality of caches holds data read from a database (see Japanese Published Patent Application No. 2000-20385). Another proposed technique to store a set of queries to a database and data obtained uses the query to simplify the management of a cache without any change in an existing application program (see Japanese Published Patent Application No. H06-274401).

However, since an ID is defined for each individual product in a wireless IC tag system, the total number of IDs becomes very large. Therefore, simply saving the attribute data once accessed is considered insufficient. For example, it is said that a store in a big supermarket chain carries three hundred thousand products with four hundred attributes (color, weight, size, date, vendor, shipping date, promotion information, advertising, image, etc.) associated with each of the products. Since a cache entry is provided on the basis of each ID of an individual product, if the number of products is three hundred thousand with two hundred individual products in stock for each kind of product, 60 million cache entries will have to be prepared for efficient access. Such a huge number of cache entries affects memory consumption when the cache is located in memory, or affects retrieval time when the cache is located on a DB. In addition, since these pieces of information are frequently replaced, the cached attribute data also needs to be frequently replaced, thereby lowering the cache hit ratio.

Japanese Published Patent Application No. 2000-20385 teaches a technique of providing a plurality of caches, but that cannot improve the cache hit ratio. On the other hand, Japanese Published Patent Application No. H06-274401 requires a determination of an inclusion relationship between a query saved in the cache and a newly received query. Since this technique deals with queries written in the syntax such as SQL, it cannot be applied to the technology of wireless IC tags that associate IDs with attribute data.

SUMMARY OF THE INVENTION

In order to solve the above problems, a cache apparatus is provided for reading and caching attribute data from a database apparatus. The attribute data is recorded for each of a plurality of attributes of each managed object in association with object identification information of the managed object defined on the basis of plural pieces of attribute identification information corresponding to the attributes. The cache apparatus comprises a cache section for recording sets, each including attribute identification information, an extractor for extracting the attribute identification information from object identification information, and attribute data identified by the attribute identification information. The cache apparatus also includes an extracting section for extracting attribute identification information from object identification information received from the outside using the extractor recorded in the cache section. A cache reading section returns to the outside the attribute data recorded in the cache section in association with the extractor on condition that the extracted attribute identification information coincides with the attribute identification information recorded in the cache section in association with the extractor. A database reading section retrieves the database apparatus with the object identification information and receives the extractor and attribute data corresponding to the object identification information on condition that the extracted attribute identification information does not coincide with the attribute identification information recorded in the cache section in association with the extractor. A cache registration section causes the cache section to record the extractor and attribute data, read by the database reading section, in association with the attribute identification information corresponding to the attribute data. A control method is also provided for the cache apparatus, and a program causes an information processing apparatus to function as the cache apparatus According to the present invention, when attribute data is read and cached from a database in which the attribute data is associated with object identification information as its identification number, a high cache hit ratio can be achieved even if the object identification information including a serial number or the like of each individual product is frequently replaced.

BRIEF DESCRIPTION OF THE DRAWINGS

FIG. 4 shows an exemplary data structure of a cache section in the cache apparatus;

FIG. 5 shows a flow of data in the attribute data management system when a client apparatus accesses a database apparatus;

FIGS. 6A and 6B compare an exemplary structure of attribute data recorded in the cache apparatus in comparison with an ordinary cache system;

FIG. 7 is a flowchart of processing for reading and sending attribute data performed by the database apparatus;

DETAILED DESCRIPTION OF THE INVENTION

Figure 1:
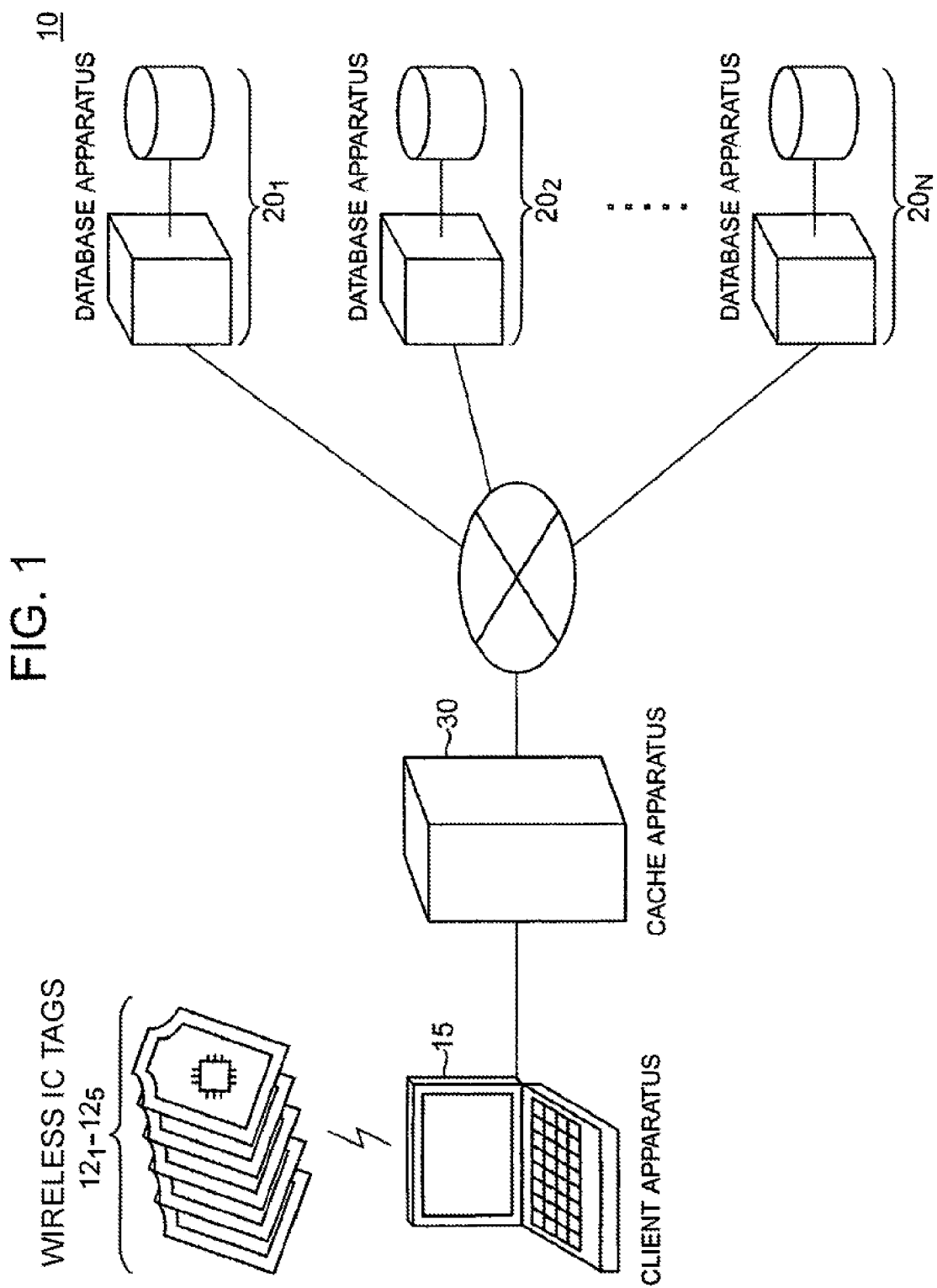
FIG. 1 shows an overall configuration of an attribute data management system according to the present invention.

FIG. 1 shows an overall configuration of an attribute data management system 10. The attribute data management system 10 includes wireless IC tags 12 ($12_1$-$12_5$), a client apparatus 15, database apparatuses 20 ($20_1$-$20_N$), and a cache apparatus 30. Each of the wireless IC tags 12 is attached to a product treated as a managed object, and holds object identification information identifying the managed object. The object identification information recorded in the wireless IC tags 12 is defined on the basis of plural pieces of attribute identification information corresponding to a plurality of attributes. The client apparatus 15 reads the object identification information from the wireless IC tags 12 and sends it to the cache apparatus 30. The database apparatus 20 records the attribute data of the managed object in association with the object identification information. The cache apparatus 30 receives the object identification information from the client apparatus 15 which is an external apparatus, and returns attribute data to the client apparatus 15 when the attribute data corresponding to the object identification information is already recorded. If the attribute data is not already recorded, the cache apparatus 30 reads the attribute data from the database apparatus 20 and returns it to the client apparatus 15.

The attribute data management system 10 aims to devise a data structure for the cache apparatus 30 to cache recorded contents from the database apparatus 20 so that a high cache hit ratio can be achieved even if the number of digits is high because the object identification information includes a serial number or the like identifying each individual product.

Since the wireless IC tags $12_1$-$12_5$ are substantially identical to each other, and the database apparatuses $20_1$-$20_N$ are also substantially identical to each other, the wireless IC tag 12 and the database apparatus 20 in the following description means $12_1$ and $20_1$, respectively, omitting the description of the other wireless IC tags $12_2$-$12_5$ and database apparatus $20_2$-$20_N$ except for different points between them.

Figure 2:
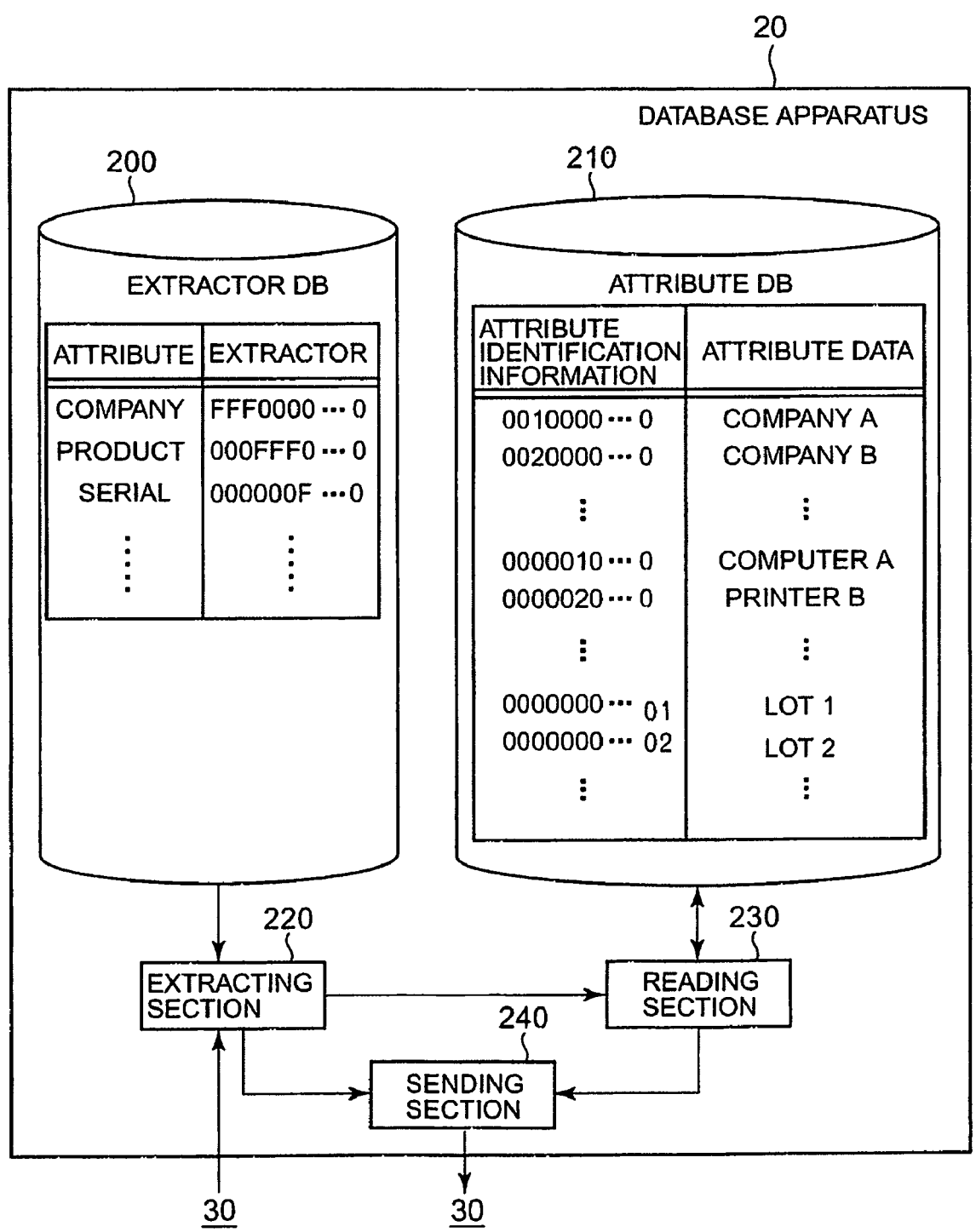
FIG. 2 shows a configuration of a database apparatus in the attribute data management system.

FIG. 2 shows a configuration of the database apparatus 20. The database apparatus 20 includes an extractor DB 200, an attribute DB 210, an extracting section 220, a reading section 230, and a sending section 240. The extractor DB 200 records, in association with an attribute of a managed object, an extractor for extracting attribute identification information identifying the attribute from object identification information. For example, the extractor DB 200 records, in association with an attribute name "COMPANY", a bit mask "FFF0000 . . . 0" for extracting the attribute identification information of the attribute from the object identification information consisting of a bit string. Then, in association with the attribute identification information, the attribute DB 210 records attribute data identified by the attribute identification information. For example, the attribute DB 210 records "COMPANY A" as a manufacturer name of a product identified by the attribute identification information "0010000 . . . 0" in association with that attribute identification information.

In FIG. 2, a character string is shown as a typical example of attribute data indicating the manufacturer name of the product for the sake of simplicity. However, it is practically desirable that the attribute data be recorded with a unified structure written in a structured language such as XML. In this case, for example, the attribute DB 210 records, in association with the attribute identification information "0010000 . . . 0", not only the manufacturer name "COMPANY A", but also other attribute data associated with the manufacturer, such as its location and contact phone number, separated with tag marks from one another. This allows an information processing apparatus to perform data processing more efficiently.

When receiving object identification information from the cache apparatus 30, the extracting section 220 extracts attribute identification information sequentially from the object identification information using each extractor recorded in the extractor DB 200. The extracting section 220 sends the extracted attribute identification information to the reading section 230 and the extractor used for extraction to the sending section 240. The reading section 230 reads each attribute data corresponding to each piece of extracted attribute identification information from the attribute DB 210, and send it to the sending section 240. The sending section 240 sends the read attribute data and the extractor used for extraction to the cache apparatus 30 as associated entities.

Figure 3:
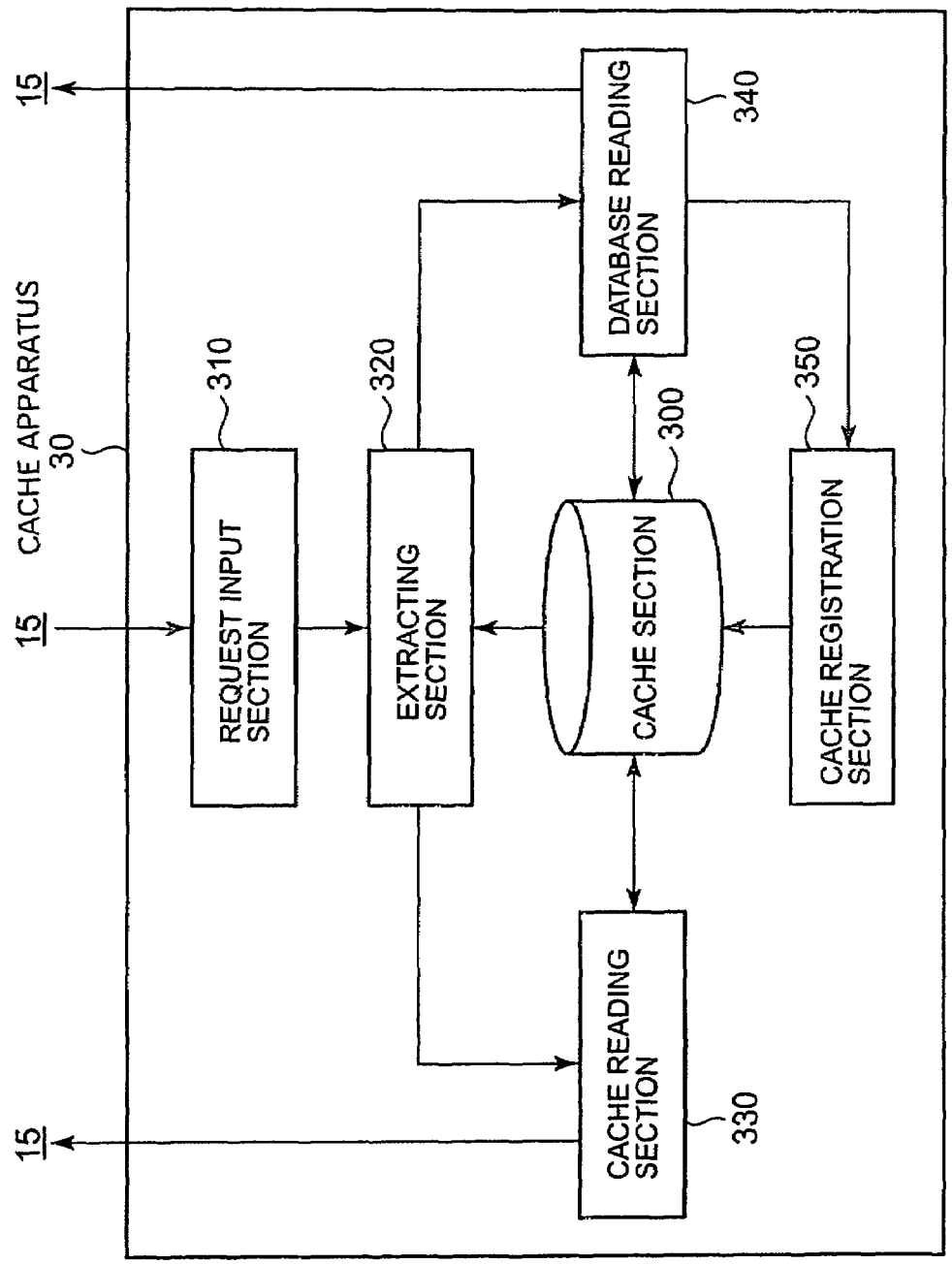
FIG. 3 is a block diagram showing the functions of a cache apparatus in the attribute data management system.

FIG. 3 is a block diagram showing the functions of the cache apparatus 30. The cache apparatus 30 includes a cache section 300, a request input section 310, an extracting section 320, a cache reading section 330, a database reading section 340, and a cache registration section 350. The cache section 300 records, as a cache entry for each of a plurality of attributes, a set of attribute identification information of that attribute, an extractor for extracting the attribute identification information from object identification information, and attribute data identified by the attribute identification information. The request input section 310 sends a cache read request to the extracting section 320 based on object identification information received from the client apparatus 15. If the client apparatus 15 specifies at least one attribute to be read from among the plurality of attributes corresponding to the object identification information, the request input section 310 adds attribute specifying information to the cache read request, and sends it to the extracting section 320.

The extracting section 320 extracts attribute identification information from the object identification information received by the request input section 310 using the extractor recorded in the cache section 300. The cache reading section 330 returns to the client apparatus 15, the attribute data recorded in the cache section 300 in association with the extractor, on condition that the extracted attribute identification information coincides with the attribute identification information recorded in the cache section 300 in association with the extractor. If the managed object is a product, the cache reading section 330 returns, for example, a product name or manufacturer name as attribute data.

The database reading section 340 retrieves the database apparatus 20 with the object identification information, and receives the extractor and attribute data corresponding to the object identification information on condition that the extracted attribute identification information does not coincide with the attribute identification information recorded in the cache section 300 in association with the extractor. If the managed object is a product, the database reading section 340 retrieves and receives, for example, a product name or manufacturer name as the attribute data from the database apparatus 20. The cache registration section 350 causes the cache section 300 to record the extractor and attribute data (for example, product name in association with the attribute identification information corresponding to the attribute data read by the database reading section 340.

FIG. 4 shows an exemplary data structure of the cache section 300. The cache section 300 records a plurality of sets each including attribute identification information, an extractor for extracting the attribute identification information from object identification information, and attribute data identified by the attribute identification information. If the managed object is a product, the cache section 300 records a set of attribute identification information for identifying the name of the product, an extractor for extracting the attribute identification information from object identification information, and the product name identified by the attribute identification information.

The extractor used here is, for example, a bitmask for extracting the attribute identification information from the object identification information as a bit string. In FIG. 4, the cache section 300 records hexadecimal bitmasks "FFF0000 . . . 0" for extracting attribute identification information identifying the manufacturer of each product. In other words, for example, if the bit string indicating the object identification information identifying the manufacturer of the product is expressed in hexadecimal, the attribute identification information is recorded in the most significant three digits. Further, the attribute identification information is a bit string obtained by masking the object identification information using a bitmask corresponding to the attribute identification information. In FIG. 4, the cache section 300 records "0010000 . . . 0" as the attribute identification information identifying the manufacturer of the product. In other words, for example, if the first (high-order) three digits of object identification information of a product are "001", the manufacturer of the product is "COMPANY A".

Note that this form of data representation of the extractor and attribute identification information shown in FIG. 4 is just an example. The cache section 300 can record in another form, for example, in a predetermined regular expression serving as both the extractor and attribute identification information in association with the attribute data. As an example, the cache section 300 can record a regular expression "001 [0-9]*" instead of the extractor "FFF0000 . . . 0" and the attribute identification information "0010000 . . . 0". In this example, "[0-9]*" is a regular expression pattern indicating any numerical character string. In this case, the extracting section 320 can determine whether the object identification information is included in the regular expression to extract the attribute identification information and determine coincidence simultaneously.

FIG. 5 shows a flow of data when the client apparatus 15 accesses the database apparatus 20. The client apparatus 15 sends "0010010 . . . 01" to the cache apparatus 30 as object identification information. The cache apparatus 30 extracts attribute identification information sequentially from the object identification information using each of a plurality of extractors recorded in the cache section 300 to determine whether the extracted attribute identification information coincides with the attribute identification information recorded in association with the extractor. As a result, if the extracted attribute identification information does not coincide with any of the attribute identification information recorded, the cache apparatus 30 searches the database apparatus 20 with the object identification information.

When receiving the object identification information, the database apparatus 20 reads attribute data corresponding to the object identification information received and returns it to the cache apparatus 30. The database apparatus 20 also returns to the cache apparatus 30 an extractor for extracting attribute identification information identifying the attribute data from the object identification information. The attribute data and extractor returned is called reply data 50.

To be more specific, the reply data 50 includes a set of attribute data and attribute name. For example, "COMPANY" is an attribute name indicating a manufacturer's attribute, and its attribute data includes the manufacturer name "COMPANY A" and its location "TOKYO". Further, "PRODUCT" is an attribute name indicating a product name, and its attribute data includes the product name "COMPUTER A" and its model name "XT40". In addition, the reply data 50 includes a bitmask indicating an extractor for extracting the attribute identification information identifying the attribute from the object identification information. For example, the bitmask for extracting the attribute identification information identifying the manufacturer from the object identification information is "FFF0000 . . . 0", while the bitmask for extracting the attribute identification information identifying the product name from the object identification information is "000FFF0 . . . 0".

When receiving the reply data 50, the cache apparatus 30 returns the attribute data in the reply data 50 to the client apparatus 15 as reply data 55, while it registers the attribute data in the cache section 300 based on the reply data 50. Next, the client apparatus 15 sends "001001342 . . . 3" to the cache apparatus 30 as object identification information. This object identification information is identical in the portions for identifying the product name and manufacturer, but different only in the serial number from the object identification information sent last time. In this case, the cache apparatus 30 reads and returns "COMPANY A" and "TOKYO" as the already recorded attribute data from the cache section 300 based on the attribute identification information identifying the product name. The cache apparatus 30 also reads from the cache section 300 and returns "computer A" and "XT40" as the already recorded attribute data based on the attribute identification information identifying the product name. In these cases, the cache apparatus 30 does not need to access the database apparatus 20.

FIG. 6 shows an exemplary structure of attribute data recorded in the cache apparatus 30 in comparison to an ordinary cache system. In the ordinary cache system, attribute data is recorded in association with object identification information (FIG. 6B). For example, in association with object identification information read from a wireless IC tag of a product, attribute data indicating that the manufacturer of the product is "COMPANY A" and the name of the product is "COMPUTER A" is recorded. Then, when object identification information is read from another wireless tag of the same product, the attribute data indicating that the manufacturer of the product is "COMPANY A" and the name of the product is "COMPUTER A" is recorded in association with the object identification information. Thus, in the ordinary cache system, if two pieces of object identification information indicate the same product but different serial numbers (in the example of FIG. 6B, the rightmost attribute identification information in the object identification information indicates a serial number), two pieces of the same attribute data are redundantly recorded on the assumption that they come from different retrievals.

On the other hand, the cache apparatus 30 according to the present invention records attribute data of each attribute in association with attribute identification information identifying the attribute data. For example, when a product name and manufacturer are retrieved with object identification information received, attribute data of each of the product name and manufacturer of the product are recorded for each attribute. In the example of FIG. 6A, the attribute data indicating that the manufacturer is "COMPANY A" and the attribute data indicating that the product name is "COMPUTER A" are recorded separately.

Thus, in the cache apparatus 30, since a cache entry is provided for each attribute identification information rather than the whole object identification information, the database search can be made more efficient even if some pieces of object identification information coincide partially with one another. Further, the volume of data to be cached can be reduced as compared with the ordinary cache system.

FIG. 7 is a flowchart showing the process for reading and sending attribute data as performed by the database apparatus 20.

The extractor DB 200 records, in association with an attribute of a managed object, an extractor for extracting attribute identification information that identifies the attribute from object identification information. For example, the extractor DB 200 records, in association with the attribute name "COMPANY", a bitmask "FFF0000 . . . 0" for extracting the attribute identification information of the attribute from the object identification information as a bit string. Then, in association with the attribute identification information, the attribute DB 210 records attribute data identified by the attribute identification information. For example, the attribute DB 210 records "COMPANY A" as the manufacturer name of a product identified by the attribute identification information "0010000 . . . 0" in association with that attribute identification information.

When receiving object identification information from the cache apparatus 30 (S700), the extracting section 220 extracts attribute identification information sequentially from the object identification information using each extractor recorded in the extractor DB 200 (S710). The reading section 230 reads attribute data corresponding to the respective extracted attribute identification information from the attribute DB 210 (S720). The sending section 240 sends the read attribute data and the extractor used for extraction to the cache apparatus 30 as associated entities (S730). If the database apparatus 20 further receives attribute specifying information, the sending section 240 may send only attribute data specified by the attribute specifying information from among the read attribute data.

Figure 8:
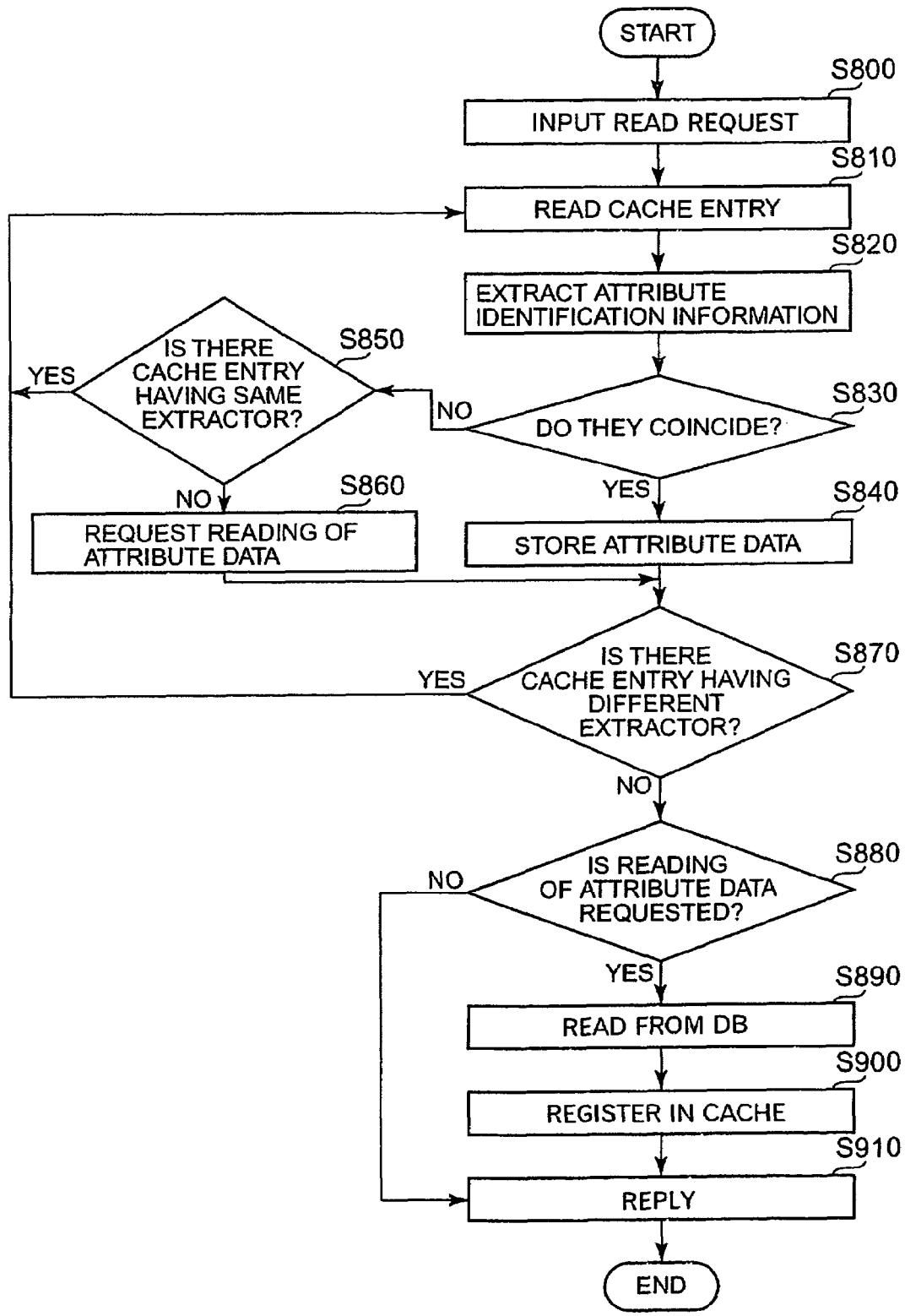
FIG. 8 is a flowchart of processing for caching attribute data or returning cached attribute data performed by the cache apparatus.

FIG. 8 is a flowchart showing the process for caching attribute data or returning cached attribute data performed by the cache apparatus 30. The request input section 310 receives object identification information from the client apparatus 15, and inputs a cache read request (S800). The client apparatus 15 can specify at least one attribute that the client apparatus wants to read from among a plurality of attributes corresponding to the object identification information. In such a case, the request input section 310 inputs a cache read request with attribute specifying information added thereto. The extracting section 320 reads each cache entry recorded in the cache section 300 to extract attribute identification information sequentially from object identification information (S810). In the example of FIG. 4, a cache entry including the extractor "FFF0000 . . . 0", the attribute identification information "0010000 . . . 0", and the attribute data "COMPANY A" are first read.

The extracting section 320 extracts the attribute identification information from the object identification information using the extractor of the cache entry read (S820). Specifically, the extracting section 320 extracts a bit string obtained by masking the object identification information using a bitmask recorded in the cache section 300. Alternatively, the extracting section 320 may extract characters the number of which is specified by the extractor from the object identification information consisting of a character string. Further, the extracting section 320 may extract as the attribute identification information only a digit specified by the extractor from the object identification information consisting of a numeric value.

The cache reading section 330 determines whether the attribute identification information extracted by the extracting section 320 coincides with the attribute identification information read in S810 (S830). The cache reading section 330 stores attribute data ("COMPANY A" in the above example) corresponding to the attribute identification information in a buffer (not shown) on condition that they coincide, preparing for reply to the client apparatus 15 (S840). If the attribute identification information does not coincide, it is then determined whether there is another cache entry having the same extractor as read in S810 (S850), and if there is another cache entry, the procedure returns to S810 to repeat the above-mentioned sequence of operations. If there is no cache entry having the same extractor, the requested attribute data is not stored in the cache, and the extracting section 320 requests the database reading section 340 to read attribute data corresponding to the attribute identification information that does not coincide with that read in S810 (S860).

Following S840 or S860, the extracting section 320 determines whether there is any other cache entry having a different extractor (S870), and if there is such a cache entry, the procedure returns to S810 to repeat the above-mentioned sequence of operations. In the example of FIG. 4, a cache entry having the extractor "000FFF0 . . . 0", the attribute identification information "0000010 . . . 0", and the attribute data "COMPUTER A" is read at that time.

If there is no cache entry with a different extractor when the cache section 300 finishes retrieving, the database reading section 340 determines whether the reading of attribute data is requested in S860 (S880). If it is requested, object identification information is sent to the database apparatus 20 as described with reference to FIG. 5 to receive a corresponding reply data 50 (S890). Then, the cache registration section 350 causes the cache section 300 to record attribute data requested in S860 from among the attribute data read by the database reading section 340 together with its extractor and attribute identification information (S900).

Finally, the cache reading section 330 returns the attribute data stored in S840 and the attribute data read in S890 from the database apparatus 20 to the client apparatus 15 (S910). If attribute specifying information is added to the cache read request, the cache reading section 330 returns only the data of the attribute specified. In this case, each of steps S810 to S900 may be performed only on the attribute specified. For example, if the specified attribute is "COMPANY", each processing step may be performed only on the extractor "FFF0000 . . . 0".

Figure 9:
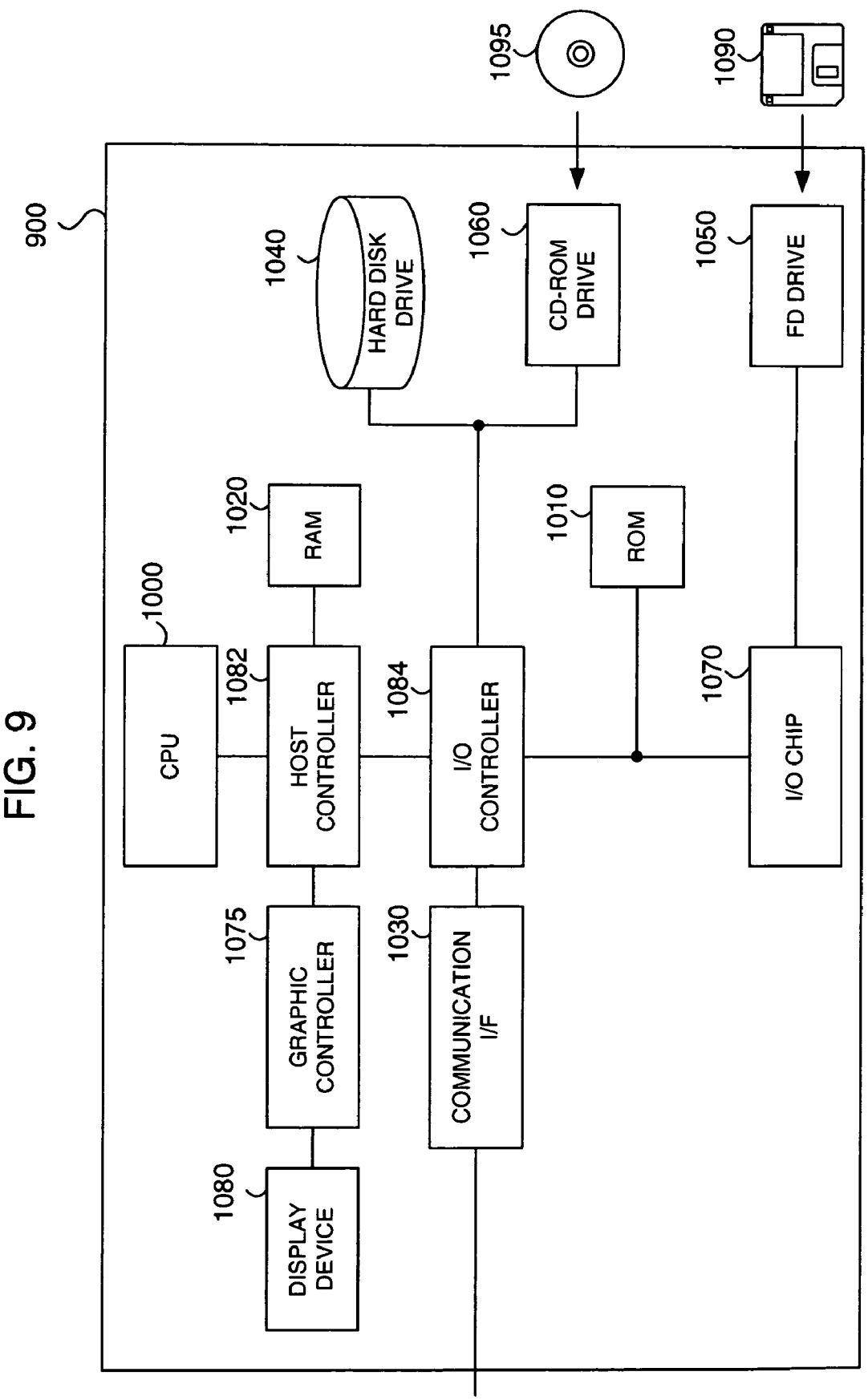
FIG. 9 is a block diagram showing an exemplary hardware configuration of an information processing apparatus functioning as the cache apparatus.

FIG. 9 is a block diagram showing an exemplary hardware configuration of an information processing apparatus 900 functioning as the cache apparatus 30. The information processing apparatus 900 includes a CPU-related section having a CPU 1000, a RAM 1020, and a graphic controller 1075 interconnected via a host controller 1082, an input/output (I/O) section having a communication interface 1030, a hard disk drive 1040, and a CD-ROM drive 1060 connected to the host controller 1082 via an I/O controller 1084, and a legacy I/O section having ROM 1010, a flexible disk drive 1050, and an I/O chip 1070 connected to the I/O controller 1084.

The host controller 1082 connects the RAM 1020 with the CPU 1000 and the graphic controller 1075 which access the RAM 1020 at a high transfer rate. The CPU 1000 operates based on programs stored in a ROM 1010 and the RAM 1020 to control each section. The graphic controller 1075 acquires image data created by the CPU 1000 or the like on a frame buffer provided in the RAM 1020 to display it on a display device 1080. Alternatively, the graphic controller 1075 may include therein a frame buffer for storing image data created by the CPU 1000 or the like.

The I/O controller 1084 connects the host controller 1082 to the communication interface 1030, the hard disk drive 1040, and the CD-ROM drive 1060 which are relatively high-speed I/O devices. The communication interface 1030 communicates with external devices through a network. The hard disk drive 1040 stores programs and data used by the information processing apparatus 900. The CD-ROM drive 1060 reads a program or data from a CD-ROM 1095, and provides it to the RAM 1020 or the hard disk drive 1040.

Further, relatively low-speed I/O devices, such as the ROM 1010, the flexible disk drive 1050, and the I/O chip 1070 are connected to the I/O controller 1084. The ROM 1010 stores a boot program executed by the CPU 1000 at startup time of the information processing apparatus 900, programs dependent on the hardware of the information processing apparatus 900, etc. The flexible disk drive 1050 reads a program or data from a flexible disk 1090, and provides it to the RAM 1020 or the hard disk drive 1040 via the I/O chip 1070. The I/O chip 1070 connects the flexible disk 1090 and various I/O devices via, for example, a parallel port, serial port, keyboard port, mouse port, etc.

A program to be provided to the information processing apparatus 900 is stored on a recording medium, such as the flexible disk 1090, the CD-ROM 1095, or an IC card, and is provided by a user. The program is read from the recording medium, installed in the information processing apparatus 900 via the I/O chip 1070 and/or the I/O controller 1084, and executed in the information processing apparatus 900. The operation of the information processing apparatus 900 caused by the program is the same as that of the cache apparatus 30 described with reference to FIGS. 1 to 8, so that its description is omitted.

The programs mentioned above may be stored on an external storage medium. The storage medium can be an optical recording medium such as a DVD or PD, a magneto-optical recording medium such as an MD, a tape medium, or a semiconductor memory such as an IC card, as well as the flexible disk 1090 or CD-ROM 1095. Alternatively, a memory device such as a hard disk or RAM installed in a server system connected to a private communication network or the Internet may be used as a recording medium so that the programs will be supplied to the information processing apparatus 900 through the network.

According to the cache apparatus 30 of the embodiment, a cache entry is provided for each attribute identification information rather than for the whole object identification information, and the database search can be made more efficient even if some pieces of object identification information coincide partially with one another. Further, the volume of data to be cached can be reduced as compared with the ordinary cache system.

While the present invention has been described with respect to an embodiment of the invention, the technical scope of the present invention is not limited to the described embodiment. It will be apparent to those skilled in the art that various changes or modifications can be made in the described embodiment. As is also apparent from the description of the appended claims, other implementations including such changes or modifications can also be included in the technical scope of the invention.

What is claimed:

1. A cache apparatus for processing object identification information records associated with managed objects, said object identification information records being provided by a managed object reader, each object identification information record including at least one attribute, an extractor defining how to identify the attribute within said object identification information record and attribute data associated with a value assignable to the attribute, said cache apparatus comprising:
   a cache section for recording a plurality of data sets, each recorded set including an attribute, an extractor defining how to identify the attribute within object identification information, and attribute data associated with the attribute;
   an extracting section for receiving an object identification information record from the managed object reader, identifying an attribute in said received object identification information record, and extracting attribute data assigned to the identified attribute in the received object identification information record;
   a cache reading section for responding to a determination that the cache section does not include a recorded set having the identified attribute and the extracted attribute data to send a query to the database apparatus;
   a receiving section for receiving a response from the database apparatus, said response comprising a database record including the identified attribute and attribute data associated with the identified attribute; and
   a cache registration section for recording the identified attribute and the associated attribute data in a recorded data set in said cache section.

2. A cache apparatus according to claim 1 wherein the attribute data associated with the attribute contained in a recorded set may have one of a plurality of values, each value representing a particular instance of an attribute.

3. A cache apparatus according to claim 2 wherein each object information identification record includes a plurality of attributes, each of which may have one or specific attribute values, and said extracting section sequentially identifies each of said plurality of attributes in an object information identification record and extracts attribute data assigned to each identified attribute.

4. A cache apparatus according to claim 3 wherein said object identification information record includes a bit string in which different bit positions are associated with different attributes while the bit values within bit positions associated to a particular attribute represent specific instances of the attribute.

5. For use in a cache apparatus including a cache section for storing sets of data with each stored data set including an attribute, an extractor defining how to identify the attribute and attribute data, a method of processing object identification information records wherein each object identification information record includes at least one attribute, an extractor defining how to identify the attribute within said object identification information record and attribute data associated with values assignable to the identified attribute comprising:
   reading an object identification information record received from a managed object reader;
   identifying an attribute in said received object identification information record and extracting attribute data assigned to the identified attribute;
   determining whether the cache section presently includes a stored data set included the identified attribute and the extracted attribute data;
   in response to a determination that the cache section does not presently include a stored data set including the identified attribute and the extracted attribute data, sending a query to a database apparatus;

receiving a response from the database apparatus, said response comprising a database record including the identified attribute and attribute data associated with the identified attribute; and storing the received response in a stored data set in the cache section.

6. A method according to claim 5 wherein the attribute data associated with the attribute contained in a recorded set may have one of a plurality of values, each value representing a particular instance of an attribute.

7. A method according to claim 6 wherein each object information identification record includes a plurality of attributes and wherein identifying an attribute in said received object identification information and extracting attribute data assigned to the identified attribute in the received object identification information further comprises performing said operations with respect to each of said plurality of attributes.

8. An article of manufacture for use in processing object identification information records associated with managed objects, wherein each object identification information record includes at least one attribute, an extractor defining how to identify the attribute within said object identification information record and attribute data associated with values assignable to the identified attribute, said article of manufacture comprising a program recording medium for storing program instructions for use in an information data processing apparatus, said program instructions comprising:

program instructions configured to store a plurality of data sets in a cache section, each recorded set including an attribute, an extractor defining how to identify the attribute within object identification information and attribute data associated with the attribute;

program instructions configured to read an object identification information record received from a managed object reader;

program instructions configured to identify an attribute in said received object identification information record and to extract attribute data assigned to the identified attribute;

program instructions configured to determine whether the cache section presently includes a stored data set included the identified attribute and the extracted attribute data;

program instructions configured, in response to a determination that the cache section does not presently include a stored data set including the identified attribute and the extracted attribute data, to send a query to a database apparatus;

program instructions configured to receive a response from the database apparatus, said response comprising a database record including the identified attribute and attribute data associated with the identified attribute; and program instructions configured to store the received response in a stored data set in the cache section.

9. An article of manufacture according to claim 8 wherein the attribute data associated with the attribute contained in a stored data set may have one of a plurality of values, each value representing a particular attribute.

10. An article of manufacture according to claim 9 wherein each object information identification record includes a plurality of attributes and wherein program instructions configured to identify an attribute in said received object identification information and to extract attribute data assigned to the identified attribute in the received object identification information further comprises program instructions for performing said operations with respect to each of said plurality of attributes.

* * * * *